US008407275B2

(12) United States Patent
Boersma et al.

(10) Patent No.: US 8,407,275 B2
(45) Date of Patent: Mar. 26, 2013

(54) FAST FLOATING POINT COMPARE WITH SLOWER BACKUP FOR CORNER CASES

(75) Inventors: Maarten J. Boersma, Holzgerlingen (DE); Michael Kroener, Ehningen (DE); Silvia M. Mueller, Altdorf (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 12/255,968

(22) Filed: Oct. 22, 2008

(65) Prior Publication Data
US 2010/0100713 A1 Apr. 22, 2010

(51) Int. Cl.
G06F 7/02 (2006.01)
(52) U.S. Cl. ........................................................ 708/671
(58) Field of Classification Search .................. None
See application file for complete search history.

(56) References Cited

U.S. PATENT DOCUMENTS

| 5,781,169 | A | 7/1998 | Kuijk et al. |
| 5,838,750 | A | 11/1998 | Rynaski et al. |
| 5,889,980 | A | 3/1999 | Smith |
| 6,912,557 | B1 | 6/2005 | North et al. |
| 7,430,656 | B2 | 9/2008 | Sperber et al. |
| 7,451,172 | B2 * | 11/2008 | Powell et al. ................. 708/501 |
| 7,974,996 | B1 * | 7/2011 | North et al. ................... 708/495 |
| 2002/0184282 | A1 | 12/2002 | Yuval et al. |
| 2006/0184601 | A1 * | 8/2006 | Trong et al. ................... 708/495 |
| 2009/0210678 | A1 * | 8/2009 | Ford .............................. 712/222 |

OTHER PUBLICATIONS

Armstrong, et al.; "Advance Virtualization Capabilities of Power5 Systems."; IBM Res. & Dev. vol. 49 No. 4/5 Jul./Sep. 2005; pp. 523-532.

Schmookler, et al., "A Low-Power, High-Speed Implementation of a PowerPC Microprocessor Vector Extension," Computer Arithmetic, 1999. Proceedings 14th IEEE on Computer Arithmetic pp. 12-19.
Power 1st Version 2.05; Oct. 23, 2007; Ch. 4 of Book 1, Section 4.2.1, pp. 100-101.
Trong, et al, "P6 Binary Floating-Point Unit," Computer Arithmetic, 200T ARITH '07, 18th IEEE Symposium on Computer Aritmetic, presented Jun. 25-27, 2007. pp. 77-86.
An American National Standard; IEEE Standard for Binary Floating-Point Arithmetic; IEEE Std 754-1985, The Institute of Electrical and Electronics Engineers, Inc.
L. Eisen, et al., IBM POWER6 accelerators: VMX and DFU; IBM J. Res. & Dev. Vol. 51, No. 6, Nov. 2007.
Silvia M. Mueller, et al., Computer Architecture: Complexity and Correctness, Springer, 2000, pp. 414-419.

* cited by examiner

Primary Examiner — David H Malzahn
(74) Attorney, Agent, or Firm — Cantor Colburn LLP; Randall Bluestone

(57) ABSTRACT

A floating point processor unit executes a floating point compare instruction with two operands of the same or different precision by comparing the two operands in integer format, which speeds up the execution of the floating point compare instruction significantly. The floating point processor now executes the floating point compare instruction at least twice as fast or faster (e.g., two clock cycles instead of five clock cycles in the prior art) for nearly most operand cases (e.g., 99% of all cases). Only the rare corner cases require additional operations on one of the operands and thus require additional cycles of execution time because the integer compare operation will not work for these corner cases. This is due to the fact that one operand is a single precision subnormal number in an unnormalized representation (i.e., has two representations) and the other operand is in the SP subnormal range such that the integer compare operation will fail.

20 Claims, 6 Drawing Sheets

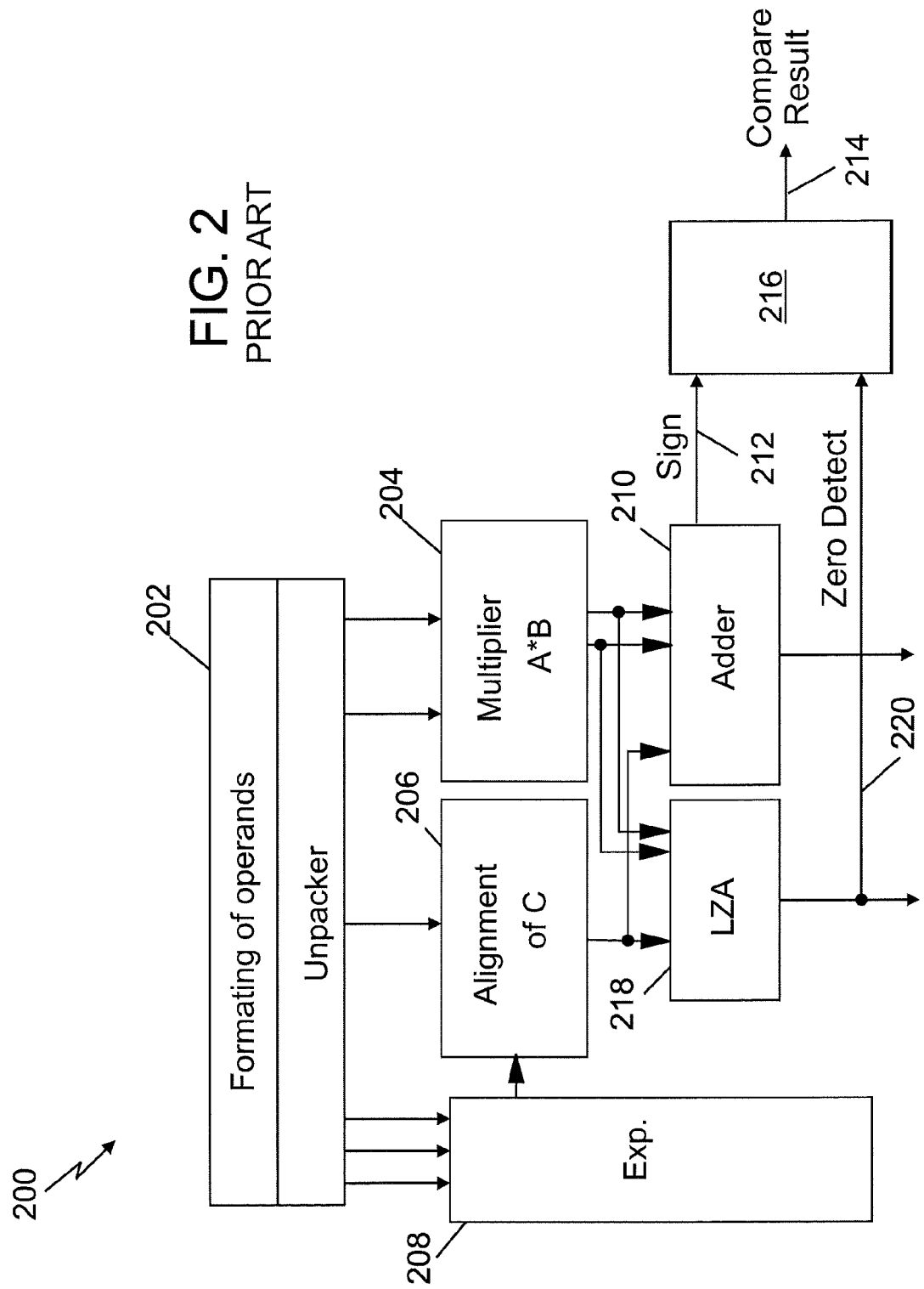

Main Paths - fast compare:
- Perform integer compare on bit strings (ea,fa) and (eb,fb)
- Apply adjustment based on sign bits sa, sb
- Apply special handling for Zeros and NaNs

FAST FLOATING POINT COMPARE WITH SLOWER BACKUP FOR CORNER CASES

GOVERNMENT RIGHTS

This invention was made with Government support under Contract No. HR0011-07-9-0002 awarded by DARPA. The Government has certain rights in this invention.

BACKGROUND

The present invention relates generally to floating point processors, and, more particularly, to floating point compare instructions executed by a floating point processor.

A binary floating point processor ("BFP") typically has to support operands and results in multiple formats, for example, 64-bit double precision ("DP") in IEEE coding, 32-bit single precision ("SP") in IEEE coding, SP in 64-bit DP IEEE coding, or 32-bit SP in Graphics or Non-Java coding. State-of-the-art BFPs typically support mixed precision, i.e., the formats of each operand and the result are independent and can be different. To support all of these and other formats in an efficient manner, the BFP converts its operands during the unpacking stage into a special internal format, and after the final rounding stage the result is converted back into the instruction specific format. The entire computation inside the BFP core is mainly independent of the input and output formats.

One common type of instruction that a BFP executes is a floating point compare instruction with two operands. Oftentimes the two operands have different or mixed floating point precision. As a result, known compare operations are generally performed on the floating point format level, which requires additional steps (e.g., a first step to subtract the operands and a second step to evaluate the difference). That is, the format differences must be detected and eliminated before the compare instruction can be completed as a special type of floating point subtraction operation. This type of instruction execution typically takes five clock cycles to complete, even for the most common cases, which is an undesirable amount of time. Clearly, this slows down the speed of the BFP, which is further undesirable given the fact that the compare instructions are performance critical.

BRIEF SUMMARY

According to an embodiment of the invention, a floating point processor unit executes a floating point compare instruction with two operands by comparing the two operands in integer format, which speeds up the execution of the floating point compare instruction significantly. The two operands may have the same precision or different precisions. The floating point processor now executes the floating point compare instruction at least twice as fast or faster (e.g., two clock cycles instead of five clock cycles in the prior art) for nearly most operand cases (e.g., 99% of all cases). Only the rare corner cases require additional operations on one of the operands and thus require additional cycles of execution time (beyond two cycles) because the integer compare operation will not work for these corner cases. This is due to the fact that one operand is a single precision subnormal number in an unnormalized representation (i.e., has two representations—"redundant format") and the other operand is in the SP subnormal range such that the integer compare operation will fail.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

FIG. 2 shows used blocks in a floating point processor for prior art compare execution for various precisions;

DETAILED DESCRIPTION

Figure 1:
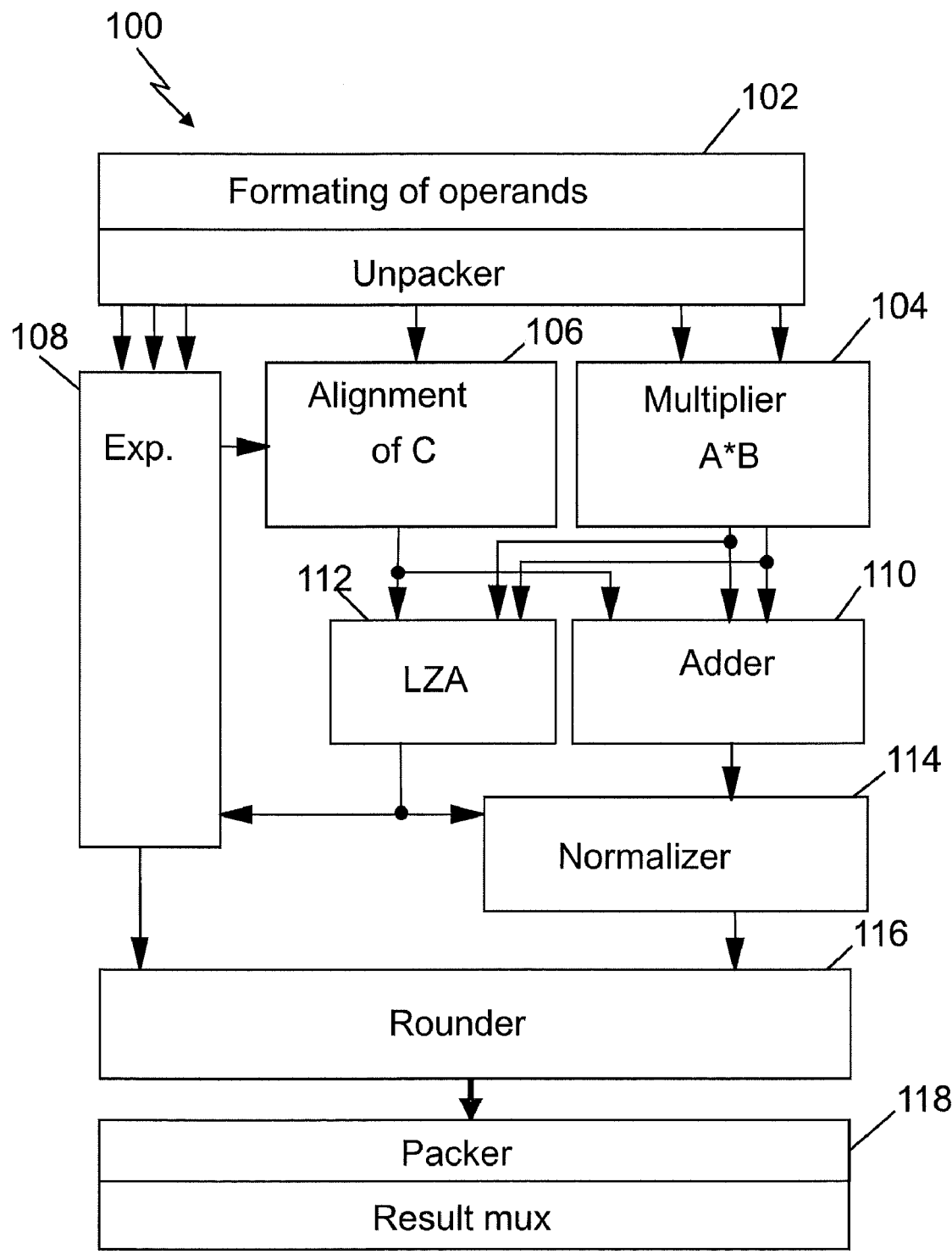
FIG. 1 is a block diagram of a floating point processor unit.
Figure 4B:
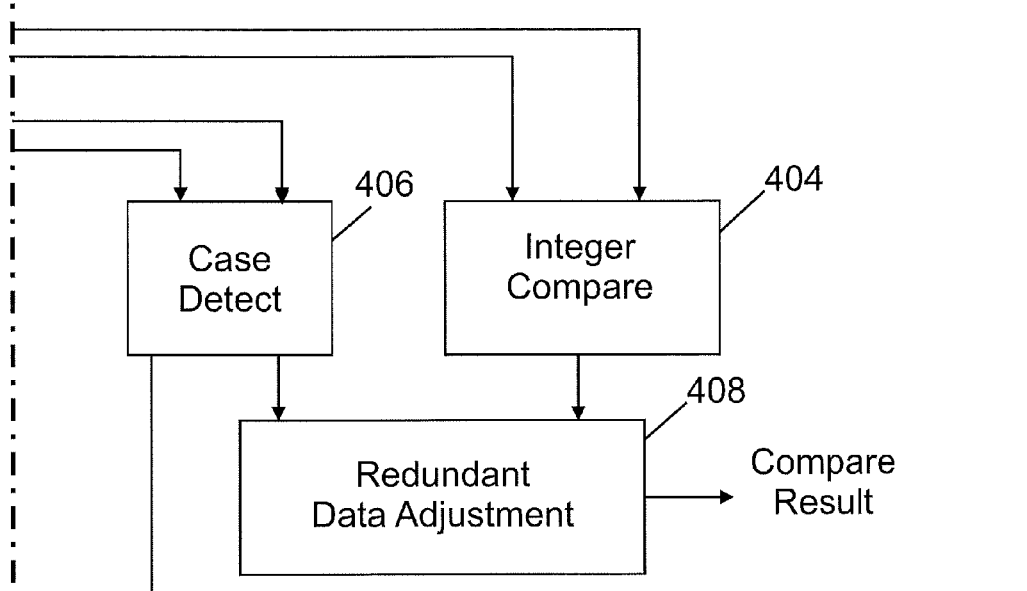
FIG. 4 is a block diagram of a floating point processor unit that includes the logic for the method according to an embodiment of the invention.

Referring to FIG. 1, there illustrated is a block diagram of a floating point processor unit ("BFP") 100, in which an embodiment of the invention may be implemented. The BFP 100 may operate according to the fused multiply-add dataflow ("R=C+A*B"), where "A" is the multiplicand, "B" is the multiplier, "C" is the addend, and "R" is the result. The dataflow of the BFP 100 illustrated in FIG. 1 includes a block 102 to format and unpack the operand into its sign, exponent and significand components. The dataflow also includes a multiplier 104, a block 106 to properly align the addend to the product of the multiplier before the addend can be added or combined with the product, and an exponent dataflow block 108. The BFP dataflow further includes an adder 110, a leading zero anticipator ("LZA") 112, a normalizer 114, a rounder 116, and a packer 118 along with its corresponding result multiplexer that converts the rounded result back into the instruction specific format.

Referring to FIG. 2, there illustrated is the blocks of a floating point processor unit ("BFP") 200, that are used to implement a prior art compare instruction for various precisions. The BFP 200 may operate according to the fused multiply-add dataflow ("R=C+A*B"), where "A" is the multiplicand, "B" is the multiplier which is equal to '1' for the compare instruction execution, "C" is the subtrahend, and "R" is the result. The dataflow of the BFP 200 illustrated in FIG. 2 includes a block 202 to format and unpack the operand into its sign, exponent and significand components. The dataflow also includes a multiplier 204, a block 206 to properly align the addend to the product of the multiplier before the addend can be subtracted or combined with the product, and an exponent dataflow block 208. The further used adder 210 computes the difference of the two operands. The sign of that difference on a line 212 determines a final result 214 of a compare operation 216 which is 'A>C' if the sign 212 is + or 'A<C' if the sign 212 is '−' except if the leading zero anticipator ("LZA") 218 detects a result equal to zero and provides it on a line 220 to the comparator 216 in which case 'A=C'.

Figure 3:
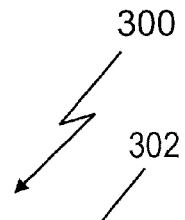
FIG. 3 is a flow diagram of a prior art floating point compare for data with like precision.

Referring to FIG. 3 there illustrated is a step 302 in a flow diagram 300 of a method of a prior art fast compare for data with like precision. The step 302 is executed in which the "fast integer compare" floating point operation is executed. Specifically, this step 302 involves the BFP 100 performing the integer compare operation on the bit strings (ea, fa) and (eb, fb) without use of the corresponding sign bits, and then applying an adjustment based on any dissimilarity of the sign bits (sa, sb). Finally, any special handling is provided for the condition where at least one of the operands are Zeros or NaNs (i.e., "not a number").

Figures 4, 4A:
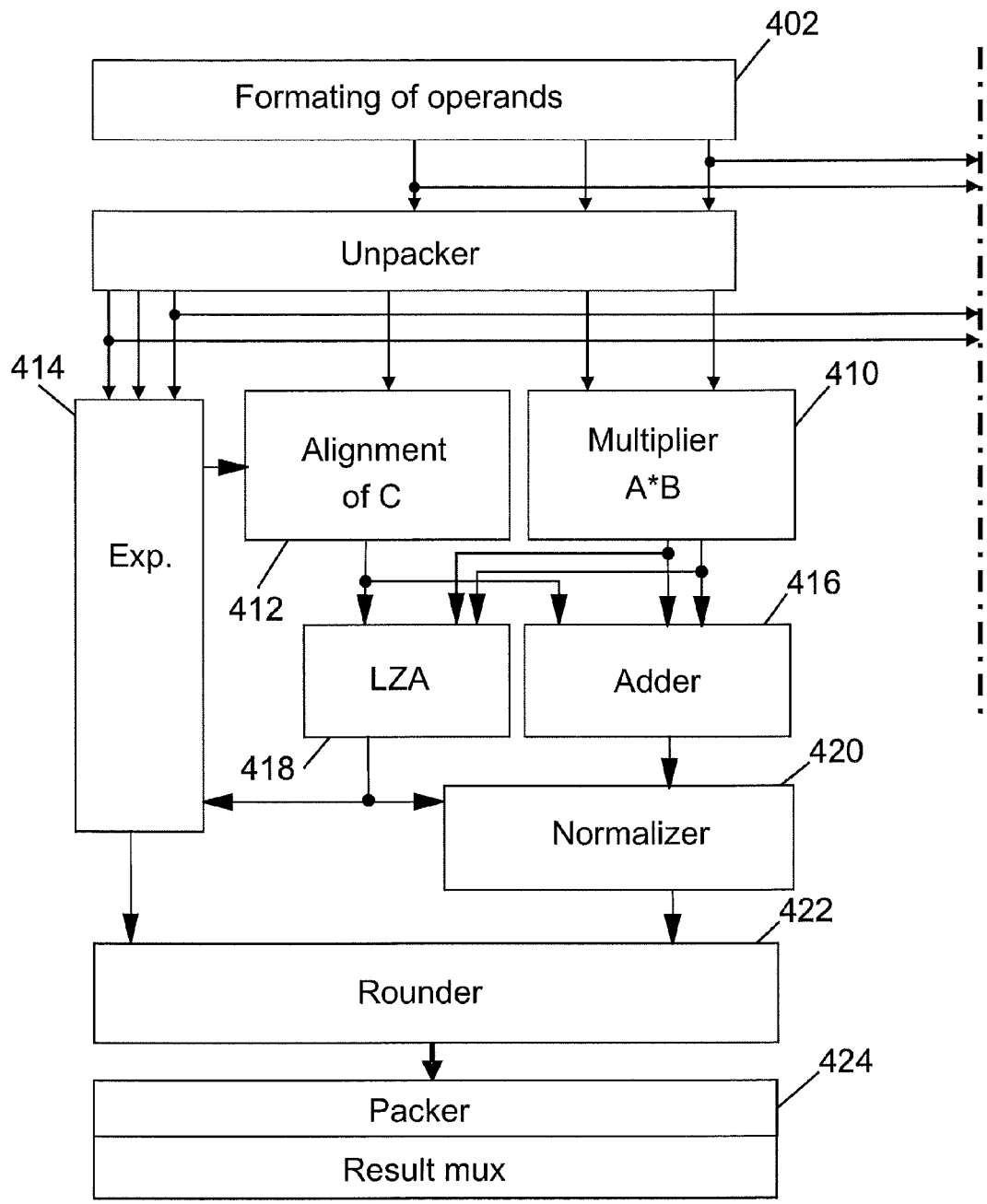

Referring to FIG. 4, there illustrated is a block diagram of a floating point processor unit ("BFP") 400, including the special hardware as used in the embodiment of the invention. The BFP 400 may operate according to the fused multiply-add dataflow ("R=C+A*B"), where "A" is the multiplicand, "B" is the multiplier, "C" is the addend, and "R" is the result. The dataflow of the BFP 400 illustrated in FIG. 4 includes a block 402 to format and unpack the operand into its sign, exponent and significand components. The dataflow also includes an integer comparator 404 which computes the fast integer compare, a case detector 406 and a redundant data adjuster 408 which work together as described in the embodiment of the invention, and seen in FIG. 5, a multiplier 410, a block 412 to properly align the addend to the product of the multiplier before the addend can be added or combined with the product, and an exponent dataflow block 414. The BFP dataflow further includes an adder 416, a leading zero anticipator ("LZA") 418, a normalizer 420, a rounder 422, and a packer 424 along with its corresponding result multiplexer that converts the rounded result back into the instruction specific format.

Figure 5:
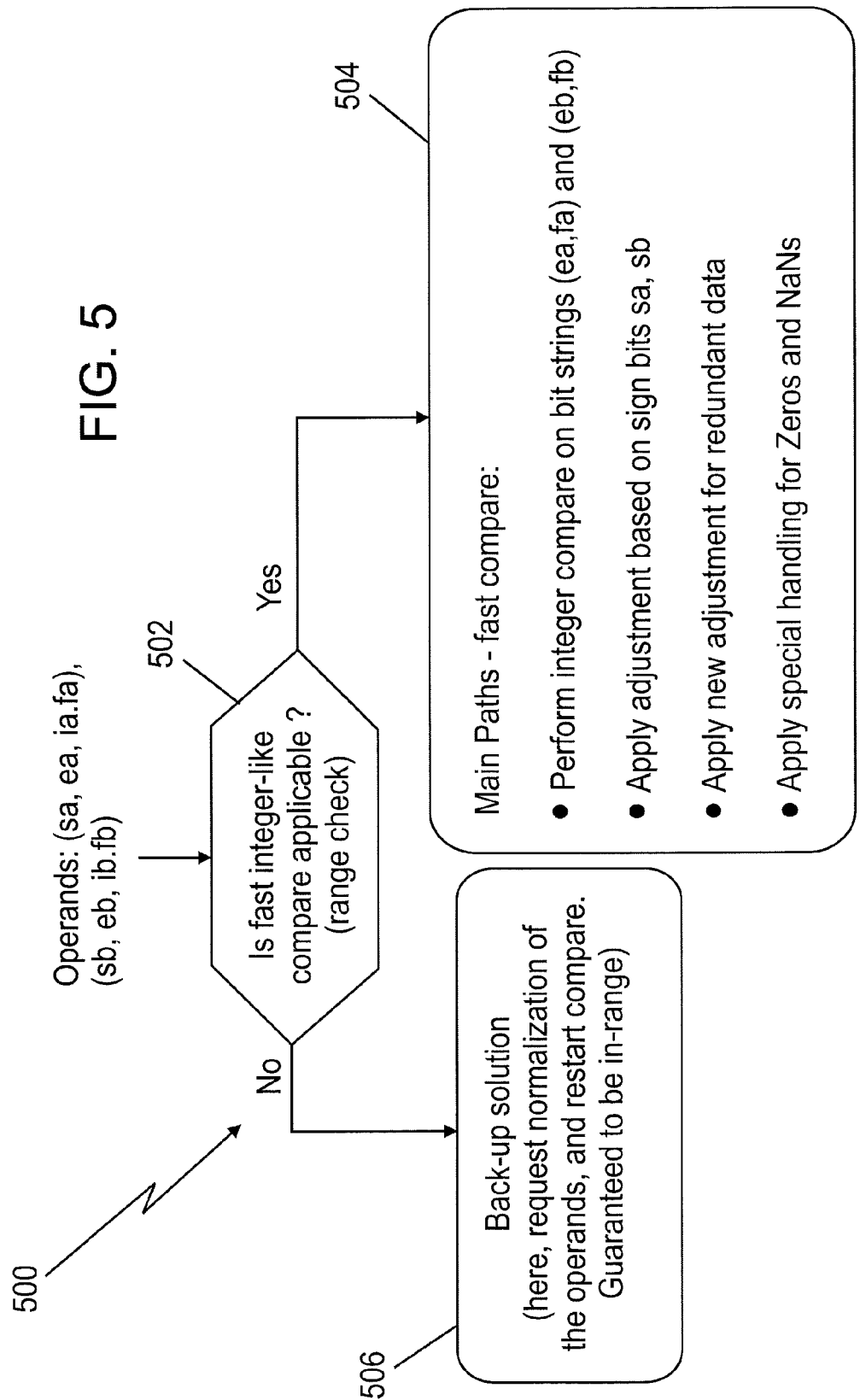
FIG. 5 is a flow diagram of a method according to an embodiment of the invention.

Referring to FIG. 5, there illustrated is a flow diagram of a method 500 according to an embodiment of the invention. The method 500 may be executed by the BFP 100 of FIG. 1 in executing a relatively fast floating point compare instruction or operation in accordance with an embodiment of the invention. The floating point processor unit 100 executes a floating point compare instruction with two operands by comparing the two operands in integer format, which speeds up the execution of the floating point compare instruction significantly (e.g., by a factor of two or more). The two operands may have the same precision or different precisions. In a step 502, the BFP checks whether or not the integer compare operation according to an embodiment of the invention is applicable to the two operands (sa, ea, and ia.fa; sb, eb, and ib.fb). The IEEE Floating Point Standard 754 defines a format for floating point numbers. This format, which may be referred to as a "packed format" in either single or double precision, is used in the memory associated with the BFP 100. Also, within a given precision, each operand has a unique representation as (s, e, f), where s is the sign (typically a single bit), e is the exponent (a number of bits), and f is the fraction (a number of bits). The check performed in the step 502 includes a range check, a special data check, a single precision subnormal check, and a sign compare, as described in detail hereinafter. Essentially, this check 502 is applied to determine if only one of the two operands is in a redundant format (i.e., has an "unnormalized" representation or has two representations). If both operands are in the redundant format, this check 502 may not need to be applied and the fast integer compare operation may be performed as described hereinafter.

If the fast integer compare operation is available as determined by the check 502, a step 504 is executed in which the "fast integer compare" floating point operation is executed. Specifically, this step 504 involves the BFP 100 performing the integer compare operation on the bit strings (ea, fa) and (eb, fb) without use of the corresponding sign bits, and then applying an adjustment based on any dissimilarity of the sign bits (sa, sb). Then an adjustment is applied for any redundant data represented by the operands. Most numbers are in non-redundant format. For example, a correction or adjustment is applied if one of the two operands is a single precision subnormal number in an unnormalized representation and the other one of the two operands is a double precision number outside of the SP subnormal range. Finally, any special handling is provided for the condition where at least one of the operands are Zeros or NaNs (i.e., "not a number").

If the fast integer compare operation is not available as determined by the step 502 (i.e., due to the existence of a "corner case"), then a step 506 is executed where a "back-up solution" is executed. As mentioned above, the "corner case" can be defined as a "back-up" case where one of the two operands is a single precision subnormal number in an unnormalized representation (i.e., is redundant has two representations) and the other operand is in the single precision subnormal range such that the integer compare operation will fail. That is, in the check 502 it is determined that all of the following conditions are met: (1) both operands have the same sign; (2) one operand is normalized; (3) the exponent of that operand is in the range of −127 to −150; and (4) the other operand is a SP subnormal number in an unnormalized format. As such, the integer compare operation will fail. The solution according to an embodiment of the invention is to request normalization of the operands and restart the compare operation. For example, the step of selectively performing a backup solution is performed by converting the two integer operands into a highest precision format and further performing the integer floating point compare that performs an integer comparison of the two operands excluding sign bits of the two operands. Also, the step of selectively performing a backup solution may be performed as a floating point subtract operation and which further comprises checking a sign of a result of the floating point subtract operation or checking if the result of the floating point subtract operation is zero.

More specifically, the current compare instruction is "flushed" and an exception handler is called. The exception handler executes "move" instructions on the SP subnormal data, which changes the operand representation to a normalized double precision (DP) number. Then, the floating point compare instruction or operation is performed again and this time the fast integer compare calculates the correct result.

In accordance with embodiments of the invention, the floating point processor 100 executes the floating point compare instruction at least twice as fast or even faster (e.g., two cycles instead of five cycles in the prior art) for nearly most operand cases (e.g., 99% of all cases). It is only the rare corner cases that require additional operations on one of the operands and thus require additional cycles of execution time because the integer compare operation will not work for these corner cases. This is due to the fact that one operand is a single precision subnormal number in an unnormalized representation (i.e., has two representations) and the other operand is in the SP subnormal range such that the integer compare operation will fail.

Figure 6:
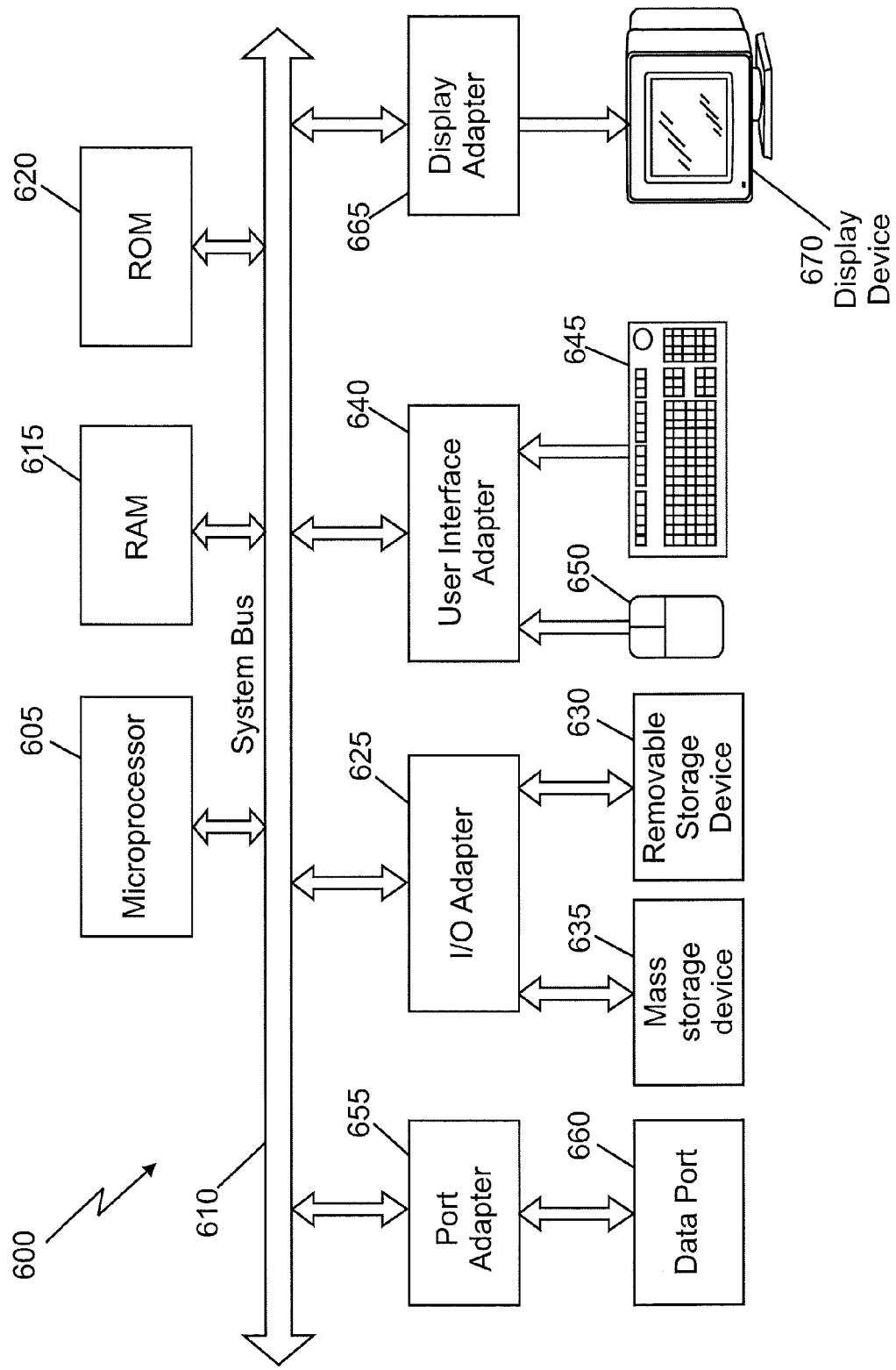
FIG. 6 is a schematic block diagram of a general-purpose computer suitable for practicing embodiments of the present invention.

Generally, an embodiment of the method disclosed herein may be practiced with a general-purpose computer and the embodiments may be coded as a set of instructions on removable or hard media for use by the general-purpose computer. FIG. 6 is a schematic block diagram of a general-purpose computer system 600 suitable for practicing embodiments of the present invention. In FIG. 6, computer system 600 has at least one microprocessor or central processing unit (CPU)

605. CPU 605 is interconnected via a system bus 610 to a random access memory (RAM) 615, a read-only memory (ROM) 620, an input/output (I/O) adapter 625 for connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computer system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for performing a floating point compare operation on two operands, comprising:
   receiving the two operands from a memory of a computer by a processor of the computer;
   checking, by the processor of the computer, for a plurality of conditions of the two operands, wherein the conditions comprise whether the two operands have similar sign bits, whether the two operands have different precisions, whether one of the two operands is a single precision subnormal floating point number in an unnormalized representation and whether the other one of the two operands is a double precision floating point number within a specific range; and
   performing an integer-like floating point compare.

2. The computer-implemented method of claim 1, wherein the integer-like floating point compare is performed as an integer comparison of the two operands excluding the sign bits of the two operands depending on results of the checking for a plurality of conditions step, wherein when the performing an integer-like floating point compare step is performed, further comprising applying a correction in case of the condition where the sign bits are not alike or if both operands are zeros or if at least one of the two operands is not a number, and applying a correction in case of the condition where one of the two operands is a single precision subnormal floating point number in an unnormalized format and the other one of the two operands is a double precision floating point number outside of the specific range; and
   selectively performing a backup solution that compares two floating point numbers of similar or different format if the step of performing an integer-like floating point compare might lead to a wrong result.

3. The computer-implemented method of claim 2, wherein the two operands have the same precision.

4. The computer-implemented method of claim 2, wherein the two operands have different precisions.

5. The computer-implemented method of claim 2, wherein the step of checking for one or more conditions of the two operands determines whether the step of performing an integer-like floating point compare can be performed and if so, the step of performing an integer-like floating point compare is performed and if not, the step of performing a backup solution is selectively performed.

6. The computer-implemented method of claim 5, wherein the step of selectively performing a backup solution is performed as a floating point subtract operation and further comprising checking a sign of a result of the floating point subtract operation or checking if the result of the floating point subtract operation is zero.

7. The computer-implemented method of claim 5, wherein the step of selectively performing a backup solution is performed by converting the two operands into a highest precision format and further comprising performing the integer-like floating point compare that performs an integer comparison of the two operands excluding sign bits of the two operands.

8. A computer program product comprising a non-transitory computer readable storage medium containing computer-readable computer program code that, when executed by a computer, implements a method for performing a floating point compare operation on two operands,
wherein the method comprises:
checking for a plurality of conditions of the two operands, wherein the conditions comprise whether the two operands have similar sign bits, whether the two operands have different precisions, whether one of the two operands is a single precision subnormal floating point number in an unnormalized representation and whether the other one of the two operands is a double precision floating number within a specific range; and
performing an integer-like floating point compare.

9. The computer program product of claim 8, wherein the integer-like floating point compare is performed as an integer comparison of the two operands excluding the sign bits of the two operands depending on results of the checking for a plurality of conditions step, wherein when the performing an integer-like floating point compare step is performed, further comprising applying a correction in case of the condition where the sign bits are not alike or if both operands are zeros or if at least one of the two operands is not a number, and applying a correction in case of the condition where one of the two operands is a single precision subnormal floating point number in an unnormalized format and the other one of the two operands is a double precision floating point number outside of the specific range; and
selectively performing a backup solution that compares two floating point numbers of similar or different format if the step of performing an integer-like floating point compare might lead to a wrong result.

10. The computer program product of claim 9, wherein the two operands have the same precision.

11. The computer program product of claim 9, wherein the two operands have different precisions.

12. The computer program product of claim 9, wherein the step of checking for one or more conditions of the two operands determines whether the step of performing an integer-like floating point compare can be performed and if so, the step of performing an integer-like floating point compare is performed and if not, the step of performing a backup solution is selectively performed.

13. The computer program product of claim 12, wherein the step of selectively performing a backup solution is performed as a floating point subtract operation and further comprising checking a sign of a result of the floating point subtract operation or checking if the result of the floating point subtract operation is zero.

14. The computer program product of claim 12, wherein the step of selectively performing a backup solution is performed by converting the two operands into a highest precision format and further comprising performing the integer-like floating point compare that performs an integer comparison of the two operands excluding sign bits of the two operands.

15. A system for implementing a floating point compare operation, comprising:
a computing network including a processing device in communication with one or more computer memory storage devices, the processing device configured to implement a method for performing a floating point compare operation on two operands, the method comprising:
checking for a plurality of conditions of the two operands, wherein the conditions comprise whether the two operands have similar sign bits, whether the two operands have different precisions, whether one of the two operands is a single precision subnormal floating point number in an unnormalized representation and whether the other one of the two operands is a double precision floating point number within a specific range; and
performing an integer-like floating point compare.

16. The system of claim 15, wherein the integer-like floating point compare is performed as an integer comparison of the two operands excluding the sign bits of the two operands depending on results of the checking for a plurality of conditions step, wherein when the performing an integer-like floating point compare step is performed, further comprising applying a correction in case of the condition where the sign bits are not alike or if both operands are zeros or if at least one of the two operands is not a number, and applying a correction in case of the condition where one of the two operands is a single precision subnormal floating point number in an unnormalized format and the other one of the two operands is a double precision floating point number outside of the specific range; and
selectively performing a backup solution that compares two floating point numbers of similar or different format if the step of performing an integer-like floating point compare might lead to a wrong result.

17. The system of claim 16, wherein the two operands have either the same precision or different precisions.

18. The system of claim 16, wherein the step of checking for one or more conditions of the two operands determines whether the step of performing an integer-like floating point compare can be performed and if so, the step of performing an integer-like floating point compare is performed and if not, the step of performing a backup solution is selectively performed.

19. The system of claim 18, wherein the step of selectively performing a backup solution is performed as a floating point subtract operation and further comprising checking a sign of a result of the floating point subtract operation or checking if the result of the floating point subtract operation is zero.

20. The system of claim 18, wherein the step of selectively performing a backup solution is performed by converting the two operands into a highest precision format and further comprising performing the integer-like floating point compare that performs an integer comparison of the two operands excluding sign bits of the two operands.

* * * * *